T. HOSTETTER.
Car-Axle Box.

No. 214,662.    Patented April 22, 1879.

Witnesses:
D. Meisner
James R. Cameron

Inventor.
Thomas Hostetter
per.
Chas. F. Meisner
Atty.

UNITED STATES PATENT OFFICE.

THOMAS HOSTETTER, OF ST. LOUIS, MISSOURI, ASSIGNOR OF FIVE-EIGHTHS HIS RIGHT TO JAMES HENRY McLEAN, OF SAME PLACE.

IMPROVEMENT IN CAR-AXLE BOXES.

Specification forming part of Letters Patent No. 214,662, dated April 22, 1879; application filed February 16, 1878.

*To all whom it may concern:*

Be it known that I, THOMAS HOSTETTER, of St. Louis and State of Missouri, have invented an Improved Journal-Bearing for Car-Axles, Shaft-Journals, &c., of which the following is a specification.

The object of my invention is to furnish a simple and reliable mode of lubricating the axles of car-wheels and similar journals, so as to greatly reduce the wear and friction and consequent heating.

The nature thereof consists in providing the bearings now in general use with slots, which serve to catch the oil, and at the same time act as air vents or passages to keep the journal well oiled and cool.

Figure 1:
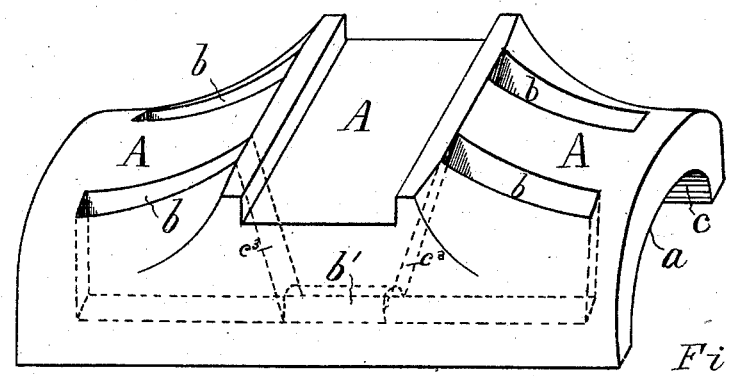
Figure 2:
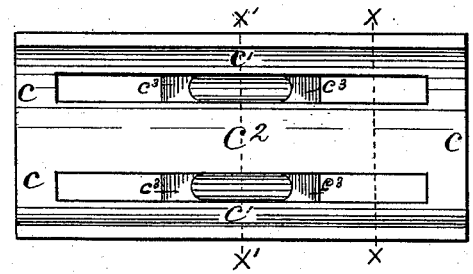
Figure 3:
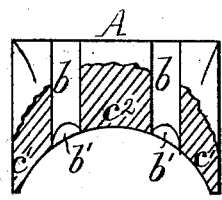
Figure 4:
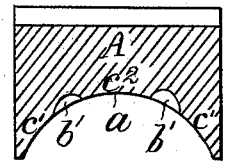

Of the drawings, Figure 1 is a perspective view of one kind of bearing now in use, together with my improvement thereon. Fig. 2 is a bottom plan of the bearing, showing the slots on the inner face of same. Figs. 3 and 4 are cross-sections on lines $x\, x$ and $x'\, x'$, respectively, of Fig. 2.

A in the drawings is the bearing, of ordinary shape and size. $a$ is its inner face, which fits around the shaft and bears on the same.

The old bearings now in use in case of a heavy load rest on the axle so firmly and close that the oil on the shaft is worn off, so that before any point of the journal has passed half-way beneath the said bearing the journal, as well as the bearing, is completely dry, thus causing great friction and wear between these parts, and consequent rapid heating of the same, often resulting in their destruction. A great waste of oil also takes place through evaporation, caused by the heating of said parts.

These difficulties I overcome by casting, cutting, or otherwise forming slots $b$ longitudinally in these bearings, which pass through them from top to bottom of the bearing, as clearly shown in the figures of the drawings. These slots can be two, four, or more in number, four being shown in the drawings. Their positions are such as to leave solid bearing portions $c$ at the ends, $c^1$ at the sides, and $c^2$ at the middle, thereby retaining the full strength of the metal at the points where the greatest strains are brought to bear, as well as retaining nearly the same amount of bearing-surface. These slots, as constructed, catch the oil on the shaft; or they can be filled with oil from above, if desired, so that although the pressure is at its greatest, the bearing on the axle or journal cannot run dry as long as oil is within the box, and the axle is oiled every time it passes under one of these slots.

To make the lubrication alike the entire length of the journal, I give the face $c^3$ of the slots an inclination from top to bottom, and connect them in pairs by grooves $b'$, so as to avoid cutting the slots the entire length of the bearing, and thus to weaken them, as clearly shown in Figs. 1 and 2.

These slots $b$ further act as ventilators or air-passages, to allow the generated heat which might arise in case the box were dry to escape through the bearing, as well as to admit cool air.

Having thus fully described my invention, what I claim is—

In a journal-bearing, A, the lubricating-slots $b\, b$, having inclined faces $c^3$, and connected in pairs by the grooves $b'$, substantially as herein shown and described, and for the purpose set forth.

In testimony of said invention I have hereunto set my hand.

THOMAS HOSTETTER.

Witnesses:
CHAS. F. MEISNER,
JAS. W. WALLACE.